United States Patent
Agostani et al.

(10) Patent No.: US 12,457,129 B2
(45) Date of Patent: Oct. 28, 2025

(54) SYSTEM AND METHOD FOR CONNECTING A CUSTOMER PREMISES EQUIPMENT

(71) Applicant: Solar Turbines Incorporated, San Diego, CA (US)

(72) Inventors: Marco Agostani, Morbio Superiore (CH); Dario Abruzzo, Como (IT); Gabriele Gianatti, Como (IT); Simone Colombo, Legnano (IT)

(73) Assignee: Solar Turbines Incorporated, San Diego, CA (US)

(*) Notice: Subject to any disclaimer, the term of this patent is extended or adjusted under 35 U.S.C. 154(b) by 433 days.

(21) Appl. No.: 17/884,393

(22) Filed: Aug. 9, 2022

(65) Prior Publication Data

US 2024/0056331 A1 Feb. 15, 2024

(51) Int. Cl.
*H04L 12/28* (2006.01)
*H04L 61/2503* (2022.01)
*H04L 101/622* (2022.01)

(52) U.S. Cl.
CPC ...... *H04L 12/2898* (2013.01); *H04L 61/2503* (2013.01); *H04L 2101/622* (2022.05)

(58) Field of Classification Search
CPC .......... H04L 12/2898; H04L 61/2503; H04L 2101/622; H04L 63/08; H04L 63/0272
See application file for complete search history.

(56) References Cited

U.S. PATENT DOCUMENTS

| | | | |
|---|---|---|---|
| 7,430,664 B2 | 9/2008 | Zhu et al. | |
| 8,181,262 B2* | 5/2012 | Cooper | H04W 12/062 726/28 |
| 9,871,675 B2 | 1/2018 | Lewis et al. | |
| 10,069,802 B2 | 9/2018 | Parry et al. | |
| 2006/0130135 A1 | 6/2006 | Krstulich et al. | |
| 2013/0081132 A1* | 3/2013 | Lee | H04L 63/0272 726/15 |
| 2015/0237018 A1 | 8/2015 | Parry et al. | |
| 2017/0118179 A1 | 4/2017 | Onno et al. | |
| 2018/0034698 A1 | 2/2018 | Perez et al. | |
| 2020/0275273 A1* | 8/2020 | Smith | H04W 12/50 |
| 2020/0389469 A1* | 12/2020 | Litichever | H04W 12/12 |
| 2021/0211418 A1* | 7/2021 | Nambannor Kunnath | H04W 12/069 |

(Continued)

FOREIGN PATENT DOCUMENTS

CN 106713100 B 11/2019

OTHER PUBLICATIONS

Written Opinion and International Search Report for Int'l. Patent Appln. No. PCT/US2023/070655, mailed Oct. 16, 2023 (13 pgs).

*Primary Examiner* — Nicholas R Taylor
*Assistant Examiner* — Angela Widhalm De Rodriguez

(57) ABSTRACT

A system and methods for automatically and securely connecting a customer premises equipment (CPE) to a headquarters production environment are disclosed. The method includes automatically transmitting handshake messages from the CPE to a headquarters pre-enrollment server; establishing a generic VPN tunnel between the CPE and an isolated server; obtaining one or more parameters from the CPE and establish the pre-enrollment tunnel; using the one or more parameters, verifying the CPE; and establishing a production tunnel between the CPE and the production environment.

20 Claims, 4 Drawing Sheets

(56) References Cited

U.S. PATENT DOCUMENTS

| | | | |
|---|---|---|---|
| 2022/0045911 A1* | 2/2022 | Chamarajnager | H04L 12/66 |
| 2022/0417218 A1* | 12/2022 | Purta | H04L 63/029 |
| 2023/0030990 A1* | 2/2023 | Shenoy | H04L 67/1074 |

* cited by examiner

SYSTEM AND METHOD FOR CONNECTING A CUSTOMER PREMISES EQUIPMENT

TECHNICAL FIELD

The embodiments described herein are generally directed to remote equipment configuration and, more particularly, to automatically and securely connecting customer premises devices via third party networks.

BACKGROUND OF THE INVENTION

Some companies/entities need to distribute customer premises equipment (CPE) to remotely located customers (e.g., by mailing the CPE or sending a technician to install the CPE) and then securely connect the CPE to company servers/networks in order to, for example, configure/maintain/update/instruct/inspect the CPE. The company often needs to use one or more third party networks (e.g., using the Internet) to connect to their CPE.

U.S. Pat. No. 10,069,802 describes a method for securely configuring a CPE in a network that includes a configuration server, a DHCP server, and the CPE. The method includes receiving a request from the CPE for leasing an Internet Protocol (IP) address to the CPE, embedding a portion of a Media Access Control (MAC) address of the CPE into the IP address, authenticating the CPE, providing configuration to the CPE. The method also includes use of characteristic attributes of the CPE to generate cryptographic keys to establish a secure connection.

The present disclosure is directed toward overcoming one or more of the problems discovered by the inventors.

SUMMARY OF THE INVENTION

In one embodiment, a method of connecting a customer premises equipment (CPE) to a production environment is disclosed. The method comprises: transmitting a handshake packet from the CPE to a pre-enrollment server via a third-party network; determining, via the pre-enrollment server, that the handshake packet is legitimate; obtaining identification parameters from the CPE; establishing a pre-enrollment tunnel between the CPE and an isolated portion of a headquarters datacenter; using the identification parameters, validating the CPE; and in response to the validating, establishing a secure connection between the CPE and the production environment.

In one embodiment, a system for connecting to a CPE via a third-party network is disclosed. The system comprises: a pre-enrollment server configured to: receive a generic VPN tunnel initiation request from the CPE; authenticate the generic VPN tunnel initiation request; establish a first generic VPN tunnel to the CPE; obtain one or more parameters from the CPE using a protected communication channel inside the generic VPN tunnel; pre-enroll the CPE establishing a second CPE ad-hoc pre-enrollment tunnel; and establish a third VPN tunnel between the CPE and a production server.

In one embodiment, a method of authenticating a CPE is disclosed. The method comprises: receiving a handshake packet from the CPE; verifying the handshake packet; at least in response to the verifying, establishing a generic VPN tunnel to the CPE; obtaining one or more CPE parameters using a protected communication channel inside the generic VPN tunnel; and based on the one or more CPE parameters, verifying the CPE as genuine and establishing a pre-enrollment tunnel.

DETAILED DESCRIPTION OF THE INVENTION

The details of embodiments of the present disclosure, both as to their structure and operation, may be gleaned in part by study of the accompanying drawings, in which like reference numerals refer to like parts, and in which.

DETAILED DESCRIPTION OF THE INVENTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

The following embodiments describe systems and methods of automatically connecting to customer premises equipment that: provide simple and fast customer network configuration, are widely and easily scalable worldwide, remove the need to initiate connection to CPE from outside customer premises network (which may be prohibited by customer premises network security), provide high levels of security, support latest security protocols, support concurrent and multiple installations of equipment on the same customer network, and allow for zero touch configuration in the field in case of hardware replacement.

Figure 1:
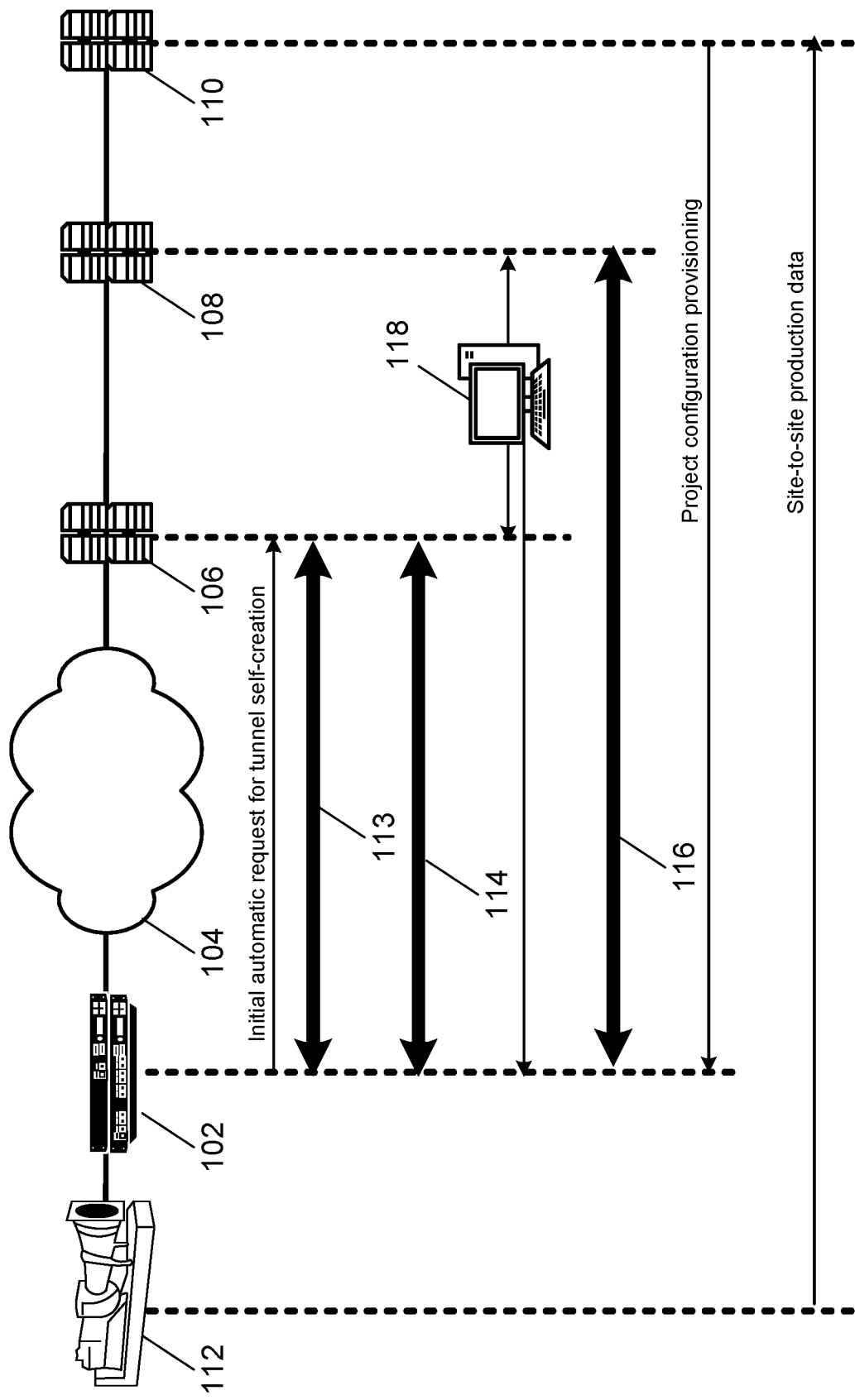
FIG. 1 shows a production system, according to an embodiment.

FIG. 1 shows a production system including data transmission, according to an exemplary embodiment.

The CPE 102 may be a network connecting device (e.g., router or gateway) that is interfaced/connected with on-site production or data collection equipment 112 (e.g., turbines, sensors, etc.). The CPE 102 is provided (e.g., leased or sold) to a customer by an entity (e.g., a company/business). The CPE is installed at a customer's premises by a technician (e.g., an employee of the company) who collects (manually or automatically) one or more parameters of the CPE 102. After installation, the company has several ways to identify and authenticate the CPE 102 using the installation parameters. For example, at installation, the technician may note down the time/date of installation and the expected IP address of the CPE. In addition, the CPE may be manufactured or pre-installed with further identifying features, for example, a device serial number. Finally, in an exemplary embodiment, the CPE 102 is pre-programmed to automatically attempt to establish a generic VPN tunnel to the company pre-enrollment server 106 by continually sending a predetermined handshake message to the pre-enrollment server 106 public IP address.

The network(s) 104 may comprise the Internet, and the CPE 102 may communicate with the pre-enrollment server 106 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. The network(s) 104 may additionally include customer premises intranet, customer premises local area network(s), LTE/4G/5G networks, etc. While the CPE 102 is illustrated as being connected to the pre-enrollment server 106 through a single set of network(s) 104, it should be understood that the CPE 102 may be connected to the various systems via different sets of one or more networks.

Company headquarters datacenter may include a pre-enrollment server 106, a production server 108, and a production environment 110. In an exemplary embodiment, the pre-enrollment server 106 may be a dedicated server having a defined pre-enrollment server IP address. Although a single pre-enrollment server 106 is discussed, the pre-enrollment server 106 may include one or more servers which hosts and/or executes one or more pre-enrollment server functions, process, methods, and/or software modules described herein. The pre-enrollment server 106 may comprise or be communicatively connected to a server application and/or one or more databases. A generic VPN tunnel 113 (initiated by the CPE 102) may be formed between the CPE 102 and the pre-enrollment server. A pre-enrollment tunnel 114 may be formed between the CPE 102 and the pre-enrollment server 106.

A user terminal 118 of the headquarters datacenter is communicatively connected to the pre-enrollment server 106 and the production server 108, and may be used by a user/engineer to access both.

The production server 108 may be a dedicated server having a defined production server IP address. In one embodiment, the production server 108 is connected to or part of the production environment 110. The production environment 110 may be a plurality of servers and/or cloud instances that aggregate and analyze data collected from a plurality of customer equipment (including remote equipment 112). For example, the production environment 110 may collect and analyze various sensor data from every remote equipment (e.g., turbine) that belongs to or is serviced by the company/business. A production tunnel 116 may be formed between the CPE 102 and the production server 108. The production tunnel 116 may be used to transmit site-to-site production data between remote equipment 112 and the headquarters production environment 110.

Figure 2:
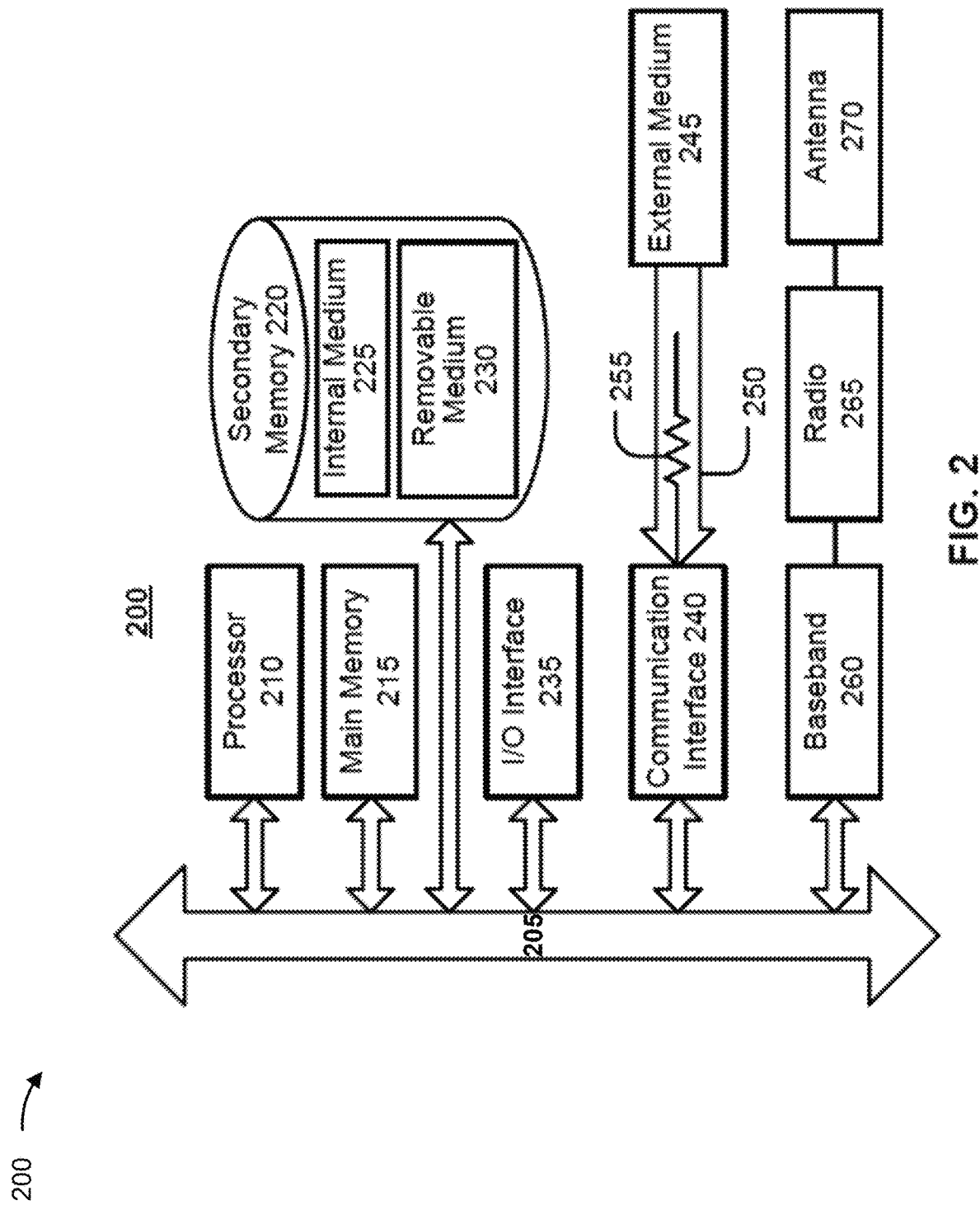
FIG. 2 shows an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of the CPE 102, the pre-enrollment server 106, the production server 108, the user device/terminal 118, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium®, Core™ i7, Xeon®, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos®) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console or in a smartphone, tablet computer, or other mobile device).

System 200 may include a communication interface 240. Communication interface 240 allows software and data to be transferred between system 200 and external devices (e.g. printers), networks (e.g., network(s) 104), or other information sources. For example, computer software or executable code may be transferred to system 200 from a network server (e.g., pre-enrollment server 106 or production server 108) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 FireWire, and any other device capable of interfacing system 200 with a network (e.g., network(s) 104) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 104), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network (e.g., network 104). The wireless communication components comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3:
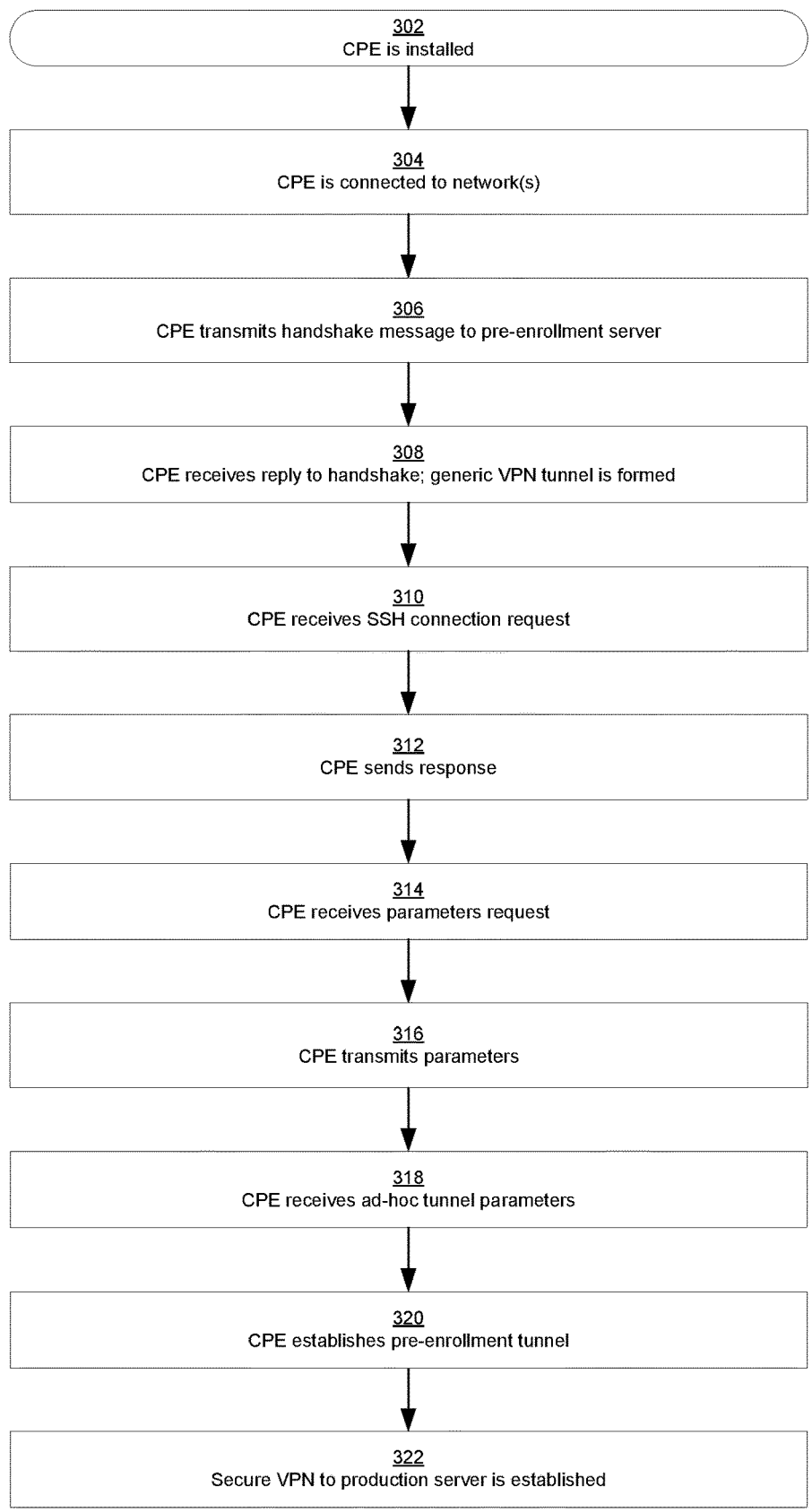
FIG. 3 shows a flow diagram of a method of automatically connecting a CPE to a production environment within the system of FIG. 1.

FIG. 3 is a flow diagram of a method of automatically connecting a CPE 102 to a company production environment 110 from the CPE 102 point of view. The method of FIG. 3 may be implemented within the system of FIG. 1. The functions/processes described in FIG. 3 may be implemented as software modules of the CPE 102 using one or more portions of the system described in FIG. 2.

In step 302, the CPE 102 is installed at a remote environment. The CPE 102 is installed as part of a wider project to collect and transmit data to and from a remote production environment 112 to the headquarters datacenter production environment 110. In an exemplary embodiment, a field technician is physically on site to install the CPE 102 and connect the CPE to the network 104. In one embodiment, the installation may happen in sync with a headquarter datacenter worker/technician, who receives identification parameters for the installation. The identification parameters are recorded/transmitted at this point as expected identification parameters for the CPE 102. The installed CPE 102 automatically includes some identification parameters, for example, a device serial number and public key(s). In addition, the field technician, during installation, collects other identification parameters, such as CPE 102 configured IP and default gateway, CPE 102 source public IP, date and time of installation, etc. In one embodiment, an expected date/time of enrollment is included in the identification. The expected date/time may be determined by the field technician, for example, based on a location of the CPE, a pre-determined schedule, etc. In one embodiment, some or all of the identification parameters may be automatically transmitted to the headquarters datacenter.

In step 304, the CPE 102 is connected to network(s) 104 through which it may be able to reach the headquarters datacenter.

In step 306, the CPE 102 announces itself by sending handshake packets to headquarters (e.g., to the pre-enrollment public server 106). In an exemplary embodiment, the CPE 102 is pre-programmed to send the handshake messages within an expected protocol to the public IP address of the pre-enrollment server 106. The CPE 102 continues (e.g., periodically or on a schedule) to send handshake messages indefinitely as long as: (i) it has the capability to send traffic over the Internet and (ii) it has not received a proper response from the pre-enrollment server 106. In an exemplary embodiment, the handshake message includes an encrypted virtual private network (VPN) initiation request. In one embodiment, the VPN initiation request is a WireGuard initiation request, however, other generic VPN protocols may be used. The encryption keys set is pre-programmed/pre-installed onto the CPE.

In step 308, the CPE 102 receives a reply to the handshake message from headquarters (e.g., from the pre-enrollment server 106). In one embodiment, the reply includes the creation of the generic VPN tunnel 113, as initiated by the CPE.

In step 310, the CPE 102 receives a secure shell (SSH) session initiation, inside the generic VPN tunnel 113. In step 312, the CPE 102 sends a reply to the SSH session.

In steps 314-320, the CPE 102 receive a request for identification parameters (step 314) and sends the identification parameters (step 316) within the SSH session. In step 316, the CPE 102 transmits its identification parameters including, for example, the device serial number, the device configured IP and default gateway, the device source public IP, the CPE installation/enrollment date and time, etc. After transmitting the identification parameters, the CPE 102 waits until the headquarter datacenter verifies the CPE 102 and, in step 318 the CPE receives ad-hoc pre-enrollment tunnel 114 configuration parameters from the pre-enrollment server 106. In step 320 the CPE establishes the ad-hoc pre-enrollment tunnel 114.

After final/manual validation, in step 322, a company headquarters datacenter server (e.g., pre-enrollment server 106, production server 108, etc.) generates a definitive production tunnel 116 from the CPE 102 to the headquarter production server 108. After the production tunnel 116 is established, the CPE 102 may transmit remote production data (e.g., turbine data) to the production environment 110.

Figure 4:
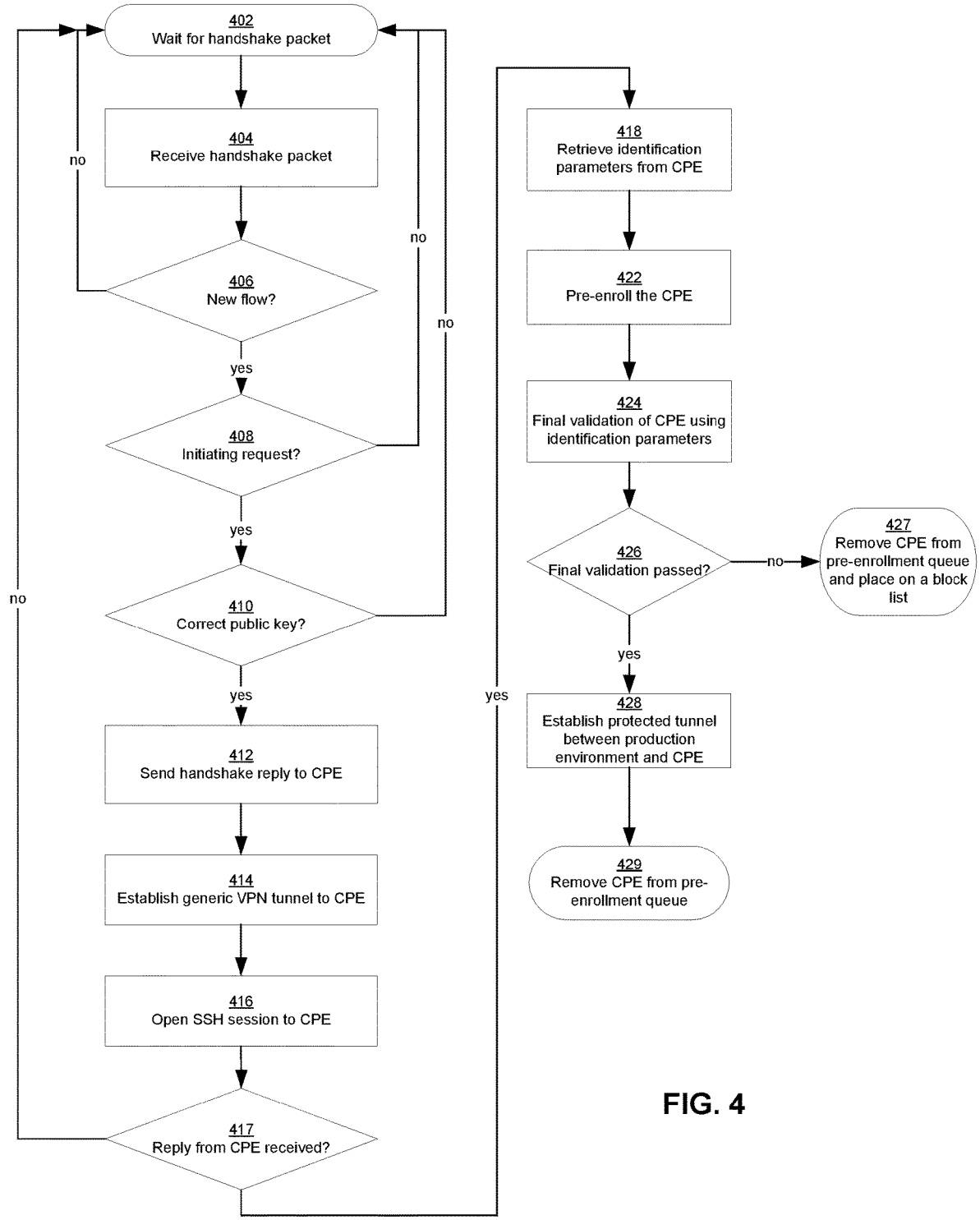
FIG. 4 shows a flow diagram of a method of authenticating and connecting to a CPE within the system of FIG. 1.

FIG. 4 is a flow diagram of the method of FIG. 3 from the headquarters point of view. The process of FIG. 4 may be implemented within the production system of FIG. 1. The functions/processes described in FIG. 4 may be at least partially implemented as software modules (e.g., of the pre-enrollment server 106, the production server 108, etc.) using one or more portions of the system described in FIG. 2.

In step 402, the pre-enrollment server 106 is ready and waiting to receive a handshake message/packet.

In step 404, the pre-enrollment server 106 receives a handshake packet from a CPE 102. In one embodiment, the handshake packet includes a VPN initiation request that is verified with the expected key.

In steps 406-410, the pre-enrollment server 106 performs initial verification steps of the handshake packet. Steps 406-410 represent a first authentication step within the method of FIG. 4. In step 406, the pre-enrollment server 106 determines that the handshake message is not part of an existing flow. If the handshake message is part of an existing flow, the pre-enrollment performs no further steps and defaults back to waiting (step 402). In step 408, if the handshake message is from a new CPE, the pre-enrollment server 106 determines whether the message includes an appropriate VPN initiation request (e.g., a WireGuard initiation request). If the packet does not include the initiation request, the pre-enrollment server 106 returns to waiting. In step 410, the pre-enrollment server 106 determines whether that the public CPE cryptokey matches the expected cryptokey. If the key does not match, the pre-enrollment server returns to step 402. Otherwise, the process moves on to step 412.

Steps 412 and 414 are performed once the handshake message has been verified. In step 412, the pre-enrollment server 106 replies to the handshake message. In step 414, the pre-enrollment server 106 establishes the generic VPN tunnel 113 to the CPE 102, based on the VPN initiation request.

In step 416, the pre-enrollment server 106 opens an SSH session to the CPE 102 in the generic VPN tunnel 113.

In step 417, the pre-enrollment server 106 receives an appropriate reply from the CPE. At this point, the device/CPE 102 is verified as a genuine CPE. This is the second authentication step within the method of FIG. 4.

In step 418, the pre-enrollment server 106 retrieves CPE identification parameters from the CPE 102 using the SSH session. In one embodiment, the pre-enrollment server 106 sends a request to the CPE 102 and receives the parameters in response to the request. The identification parameters may include one or more of: a device serial number, device configured IP and default gateway, device source public IP, and installation and/or enrollment date/time.

In step 422 the pre-enrollment server 106 pre-enrolls the CPE 102 (sends ad-hoc tunnel parameters to the CPE, establishes the pre-enrollment tunnel and inserts the CPE into a pre-enrollment queue). In an exemplary embodiment, the pre-enrollment server 106 also transmits a command to the CPE 102 to, for example, show a notification/message (e.g., to inform users that the device is pre-enrolled) on a display of the CPE 102. In step 422, the CPE 102 waits in the pre-enrollment queue until final validation and the pre-enrollment server 106 processes are complete.

In step 424, final validation of the CPE 102 is performed. The final validation is the third authentication step of the method of FIG. 4. The final validation includes verifying at least some of the identification parameters received from the CPE 102 with expected identification parameters (e.g., collected during installation of the CPE or known from the manufacturer). The identification parameters used in the final validation step may include one or all of: a public IP address of the CPE, installation or enrollment date and time, etc. In one embodiment, the enrollment date and/or time received from the CPE is compared to the current date/time. In another example, the installation date/time received from the CPE is compared to the current date/time and verified if the current date/time is within a particular time frame from the installation date/time. For example, enrollment process may be expected to occur within a particular time period after CPE installation (e.g., a month, a year, etc.).

In step 426, if the final validation of the CPE 102 is passed, the process moves on to connect the CPE to the production server (step 428) and the CPE is removed from the pre-enrollment queue (step 429). Otherwise, if the final validation is not passed, in step 427, the CPE 102 is removed from the pre-enrollment queue, and, optionally, put in a block list.

The tunnel 116 established in step 428 between the CPE 102 and the headquarters datacenter production server 108 is a protected VPN tunnel 116 that may be used by the CPE 102 to transmit production data from the remote production environment 112 to the headquarters production environment 110 and vice versa. The protected VPN tunnel may be used by the production server 108 to securely: collect data from the remote environment 112, send instructions to the remote environment 112, configure the CPE 102, etc.

In an exemplary embodiment, the final validation 426 is a manual validation process performed by an engineer/worker of the headquarters center via, for example, a user terminal 118 (FIG. 1). In some embodiments, a worker must manually check that the identification parameters received from the CPE during the pre-enrollment process match the expected identification parameters (e.g., collected by the technician during CPE installation and/or determined for the CPE during manufacturing/pre-programming). In an alternate embodiment, some or all parts of the final validation are performed automatically via one or more software modules (e.g., within system 200).

While processes of FIGS. 3 and 4 are illustrated with certain arrangements and ordering of subprocesses, the processes may be implemented with fewer, more, or different subprocesses and different arrangements and/or ordering of subprocesses. It should be understood that any subprocess, which does not depend on the completion of another subprocess, may be executed before, after, or in parallel with that other independent subprocess, even if the subprocesses are described or illustrated in a particular order.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of processing system or machine. Hence, although the present embodiments are, for convenience of explanation, depicted and described as being implemented in a specific processing system it will be appreciated that it can be implemented in various other types of processing system and machines. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method of connecting a customer premises equipment (CPE) to a production environment, comprising:
    transmitting a handshake packet, that includes a virtual private network (VPN) initiation request, from the CPE to a pre-enrollment server, which is an isolated portion of a headquarters datacenter, via a third-party network, wherein the headquarters datacenter includes the pre-enrollment server and a production server, and wherein the CPE is connected to a turbine;
    establishing a generic VPN tunnel and opening a secure shell (SSH) session to the CPE, based on the VPN initiation request, to communicate CPE identification parameters and ad-hoc parameters;
    establishing, using the ad-hoc parameters, a pre-enrollment VPN tunnel between the CPE and the pre-enrollment server; and
    in response to validation of the CPE identification parameters, establishing a production VPN tunnel between the CPE and the production server for transmission of production data relating to the turbine.

2. The method of claim 1, wherein transmitting the handshake packet comprises: transmitting the handshake packet on a continuous basis.

3. The method of claim 1, wherein transmitting the handshake packet comprises automatically transmitting the handshake packet to a public IP address pre-programmed on the CPE.

4. The method of claim 1, further comprising:
    determining that the handshake packet is legitimate by verifying the handshake packet with an expected key.

5. The method of claim 1, further comprising:
    determining that the handshake packet is legitimate by determining that the handshake packet includes the VPN initiation request.

6. The method of claim 1, further comprising:
    determining that the handshake packet is legitimate by determining that the handshake packet is not part of an existing flow.

7. The method of claim 1, further comprising:
    validating the CPE by enabling a user of the headquarters datacenter to view at least some of the CPE identification parameters; and receiving, from the user, a manual validation of the CPE.

8. The method of claim 1, further comprising:
    validating the CPE by automatically comparing at least some of the CPE identification parameters to one or more expected parameters.

9. The method of claim 1, wherein the CPE identification parameters include one or more of: a unique serial number, a public IP address, an enrollment time.

10. The method of claim 9, further comprising: placing the CPE in a pre-enrollment queue.

11. The method of claim 10, further comprising: prior to placing the CPE in the pre-enrollment queue, determining that the CPE is available to be pre-enrolled.

12. The method of claim 11, wherein determining that the CPE is available to be pre-enrolled comprises determining that the unique serial number is not already placed in the pre-enrollment queue.

13. The method of claim 11, wherein determining that the CPE is available to be pre-enrolled comprises determining that the unique serial number is not in a database of enrolled devices.

14. A system for connecting to a customer premises equipment (CPE) via a third-party network, the system comprising a pre-enrollment server configured to:
    receive a generic virtual private network (VPN) tunnel initiation request from the CPE,
        wherein the CPE is connected to on-site production or data collection equipment;
    authenticate the generic VPN tunnel initiation request;
    establish, based on the generic VPN tunnel initiation request, a first generic VPN tunnel between the pre-enrollment server and the CPE to communicate CPE identification parameters and ad-hoc parameters using a protected communication channel inside the first generic VPN tunnel;
    pre-enroll the CPE by establishing, using the ad-hoc parameters, a second CPE ad-hoc pre-enrollment VPN tunnel between the pre-enrollment server and the CPE; and
    establish, based on validation of the CPE identification parameters, a third VPN tunnel between the CPE and a production server for transmission of production data relating to the on-site production or data collection equipment.

15. The system of claim 14, wherein the pre-enrollment server is isolated from the production server.

16. The system of claim 14, wherein pre-enrolling the CPE is based on the CPE identification parameters and further comprises determining that a unique serial number of the CPE is not in database of enrolled devices; and based at least on the determination, pre-enrolling the CPE.

17. The system of claim 14, wherein the on-site production or data collection equipment comprises a turbine.

18. A method of authenticating a customer premises equipment (CPE) connected to on-site production or data collection equipment via a pre-enrollment server which is an isolated portion of a headquarters datacenter, the method comprising:

receiving a handshake packet, that includes a virtual private network (VPN) initiation request, from the CPE at the pre-enrollment server;

verifying the handshake packet;

at least in response to the verifying, establishing, based on the VPN initiation request, a generic VPN tunnel between the CPE and the pre-enrollment server to communicate one or more CPE identification parameters and ad-hoc parameters using a protected communication channel inside the generic VPN tunnel; and based on the one or more CPE identification parameters, verifying the CPE as genuine and establishing, using the ad-hoc parameters, a pre-enrollment VPN tunnel between the CPE and the pre-enrollment server.

19. The method of claim 18, further comprising: prior to receiving the handshake packet, obtaining expected identification parameters of the CPE.

20. The method of claim 19, wherein at least some of the expected identification parameters are related to a physical installation of the CPE.

\* \* \* \* \*